United States Patent
Vandenbark et al.

[11] Patent Number: 6,139,045
[45] Date of Patent: Oct. 31, 2000

[54] WHEEL ASSEMBLY HAVING A MECHANISM TO ADJUST THE DISTANCE BETWEEN THE WHEELS

[75] Inventors: Gary A. Vandenbark, Markleville; Kenneth E. Weddle, Trafalgar, both of Ind.

[73] Assignee: Land O' Lakes, Inc., Arden Hills, Minn.

[21] Appl. No.: 09/030,141

[22] Filed: Feb. 25, 1998

Related U.S. Application Data

[60] Provisional application No. 60/039,122, Feb. 25, 1997.

[51] Int. Cl.[7] .............................. B62B 1/00; B60B 35/10
[52] U.S. Cl. ...................... 280/638; 280/93.51; 180/209; 180/906; 180/429
[58] Field of Search .................. 280/638, 93.51, 280/93.513, 93.504, 93.514; 180/906, 209, 429, 434, 417, 424; 301/124.1

[56] References Cited

U.S. PATENT DOCUMENTS

| | | | |
|---|---|---|---|
| 2,173,419 | 9/1939 | Johnson | 280/638 |
| 2,427,710 | 9/1947 | Bush | 180/417 |
| 3,531,127 | 9/1970 | Ganz et al. | 280/93.513 |
| 3,782,491 | 1/1974 | Herbenar . | |
| 4,350,222 | 9/1982 | Lutteke et al. . | |
| 5,039,129 | 8/1991 | Balmer . | |
| 5,086,864 | 2/1992 | Elser | 180/429 |
| 5,121,808 | 6/1992 | Visentini et al. | 180/906 |
| 5,282,644 | 2/1994 | Larson | 280/638 |
| 5,308,095 | 5/1994 | Fabris et al. | 280/93.514 |
| 5,489,113 | 2/1996 | Torborg | 280/638 |

*Primary Examiner*—Lanna Mai
*Assistant Examiner*—Lynda Jasmin
*Attorney, Agent, or Firm*—Bose McKinney & Evans LLP

[57] ABSTRACT

A vehicle having a pair of front wheels coupled to a wheel assembly is provided. The wheel assembly includes a wheel-spacing mechanism, a pair of spaced-apart spindle assemblies, and a steering mechanism. The wheel-spacing mechanism includes a center axle tube, a pair of axle arms coupled to the center axle tube for axial telescoping movement relative to the center axle tube, and means for extending and retracting the axle arms relative to the center axle tube. Each of the pair of spaced-apart spindle assemblies includes a spindle shaft coupled to the respective axle arm for pivoting movement about a substantially vertical axis. Each wheel is coupled to the respective spindle shaft for rotation about a substantially horizontal wheel axis. The steering mechanism includes a pair of telescoping drive shafts and means for rotating each telescoping drive shaft about a horizontal pivot axis. Each of the telescoping drive shafts includes a first end coupled to the rotating means and a second end coupled to the respective spindle shaft. The second ends of the telescoping drive shafts move axially relative to the first ends as the axle arms are moved relative to the center axle tube. Rotation of the telescoping drive shafts about the horizontal pivot axis pivots the spindle shafts about the respective vertical pivot axes to turn the front wheels in unison.

45 Claims, 3 Drawing Sheets

WHEEL ASSEMBLY HAVING A MECHANISM TO ADJUST THE DISTANCE BETWEEN THE WHEELS

This patent application is a continuation application of U.S. Provisional Patent Application Ser. No. 60/039,122 filed Feb. 25, 1997 by Gary A. Vandenbark and Kenneth E. Weddle.

BACKGROUND AND SUMMARY OF THE INVENTION

The present invention relates to a vehicle such as a farm vehicle, and particularly, to a vehicle having a front wheel assembly that adjusts the spacing between the front wheels, for example, to match the row spacing of a crop. More particularly, the present invention relates to a steering mechanism that turns the front wheels of the vehicle when the front wheels are at any position between maximum and minimum spacings.

Farm vehicles having front wheels that can be moved to adjust the spacing between the wheels are known in the art. See, for example, U.S. Pat. No. 5,489,113 to Torborg; U.S. Pat. No. 5,282,644 to Larson; and U.S. Pat. No. 4,350,222 to Lutteke et al., each of which disclose mechanisms for adjusting the spacing between front wheels of a vehicle. It is desirable to adjust the spacing between front wheels of the farm vehicle to match the row spacing of a crop in which the vehicle is being used to minimize damage to the crop.

Some farm vehicles having front wheel adjustment mechanisms include separate hydraulic cylinders that are actuated to turn the front wheels of the vehicle thereby providing for steering of the vehicle. See, for example, the '113 patent to Torborg; the '644 patent to Larson; and U.S. Pat. No. 5,039,129 to Balmer and U.S. Pat. No. 3,782,491 to Herbenar, each of which disclose hydraulic cylinders having pistons that are linearly extended and retracted to turn the front wheels of a farm vehicle.

Many vehicles include tie rods that couple front wheels of the vehicle together so that the front wheels turn in unison during steering of the vehicle. Many conventional tie rods move toward one side of the vehicle or the other as the front wheels are turned. Some vehicles that include front wheel adjustment mechanisms also include tie rods that are adjusted as the spacing between the front wheels is adjusted. In such vehicles, a mechanism is usually provided for fixing the length of the tie rod after adjustment. See, for example, the Herbenar '491 patent which shows a tie rod including telescoping rods having a pin which can be manually inserted through one set of a series of bores formed in the rods to rigidly couple the rods together after the length has been adjusted. Also see the Torborg '113 patent, which shows a tie rod including a linear hydraulic cylinder that is actuated by a complex hydraulic system to adjust the length of the tie rod as the spacing between the front wheels of the vehicle is hydraulically adjusted.

In practice, many adjustable tie rod systems can cause variations of the toe-in angle of the front wheels as the distance between the front wheels is adjusted. For example, tie rods of the type disclosed in the Herbenar '491 patent can be indexed only by discrete distances dictated by the spacing between the bores formed in the rods. Hydraulic tie rods of the type disclosed in the Torborg '113 patent can experience internal hydraulic fluid loss between moving mechanical components and external hydraulic fluid loss due to leakage. The hydraulic fluid losses of one hydraulic cylinder are inherently different from the hydraulic fluid losses of another hydraulic cylinder. Thus, with regard to a wheel spacing and tie rod system of the type disclosed in the Torborg '113 patent, the hydraulic tie rod cylinder and the hydraulic cylinders that change the wheel spacing must be rephased after several front wheel spacing adjustments to prevent toe-in angle variations from occuring during wheel spacing adjustments.

What is needed is a vehicle having a wheel-spacing mechanism for adjusting the distance between front wheels of the vehicle and a steering system including a mechanism that ties the front wheels together so that the front wheels turn in unison, but that does not result in toe-in angle variations as the spacing between the front wheels is adjusted. Vehicle operators would welcome a vehicle having a steering system that automatically adjusts when the front wheel spacing is adjusted without the need to separately manipulate any part of the steering system and without the need to rephase the steering system after repeated front wheel adjustments.

According to the present invention, a vehicle is provided with a wheel-spacing mechanism including a center axle tube and an axle arm extending from each end of the center axle tube. L-shaped spindles are coupled to each axle arm for pivoting movement about a substantially vertical axis and front wheels are mounted to respective spindle shafts for rotation about a substantially horizontal axis. A hydraulic cylinder connects each axle arm to the center axle tube so that extension and retraction of the hydraulic cylinders telescopically moves the axle arms relative to the center axle tube thereby adjusting the distance between the front wheels.

The vehicle is also provided with a steering mechanism including a central rotary hydraulic motor mounted on the center axle tube and a pair of telescoping drive shafts extending outwardly away from the hydraulic motor in opposite directions. Each telescoping drive shaft includes an inner shaft that couples to the rotary motor for rotation about a generally horizontal drive axis and an outer shaft that couples to the inner shaft for telescoping movement relative to the inner shaft along the horizontal drive axis. Extension and retraction of the hydraulic cylinders connecting the center axle tube to the axle arms automatically causes the outer shafts to telescope relative to the inner shafts.

The vehicle includes a steering wheel operably coupled to the rotary hydraulic motor through a hydraulic control system so that rotation of the steering wheel operates the rotary hydraulic motor. Operation of the rotary hydraulic motor results in rotation of both inner shafts about the common horizontal drive axis. In addition, each inner shaft is rotationally drivingly coupled to the respective outer shaft so that rotation of the inner shafts by the hydraulic motor results in rotation of the outer shafts.

The steering mechanism of the present invention includes a pair of gear boxes, each of which includes an input shaft that couples to the respective outer shaft of the telescoping drive shafts to rotate therewith about the horizontal drive axis in response to rotation of the steering wheel. Each gear box is also coupled to a respective L-shaped spindle shaft so that rotation of the outer shafts about the horizontal drive axis results in pivoting movement of the spindle shafts about their respective vertical axes, thereby causing the front wheels of the farm vehicle to turn in unison.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
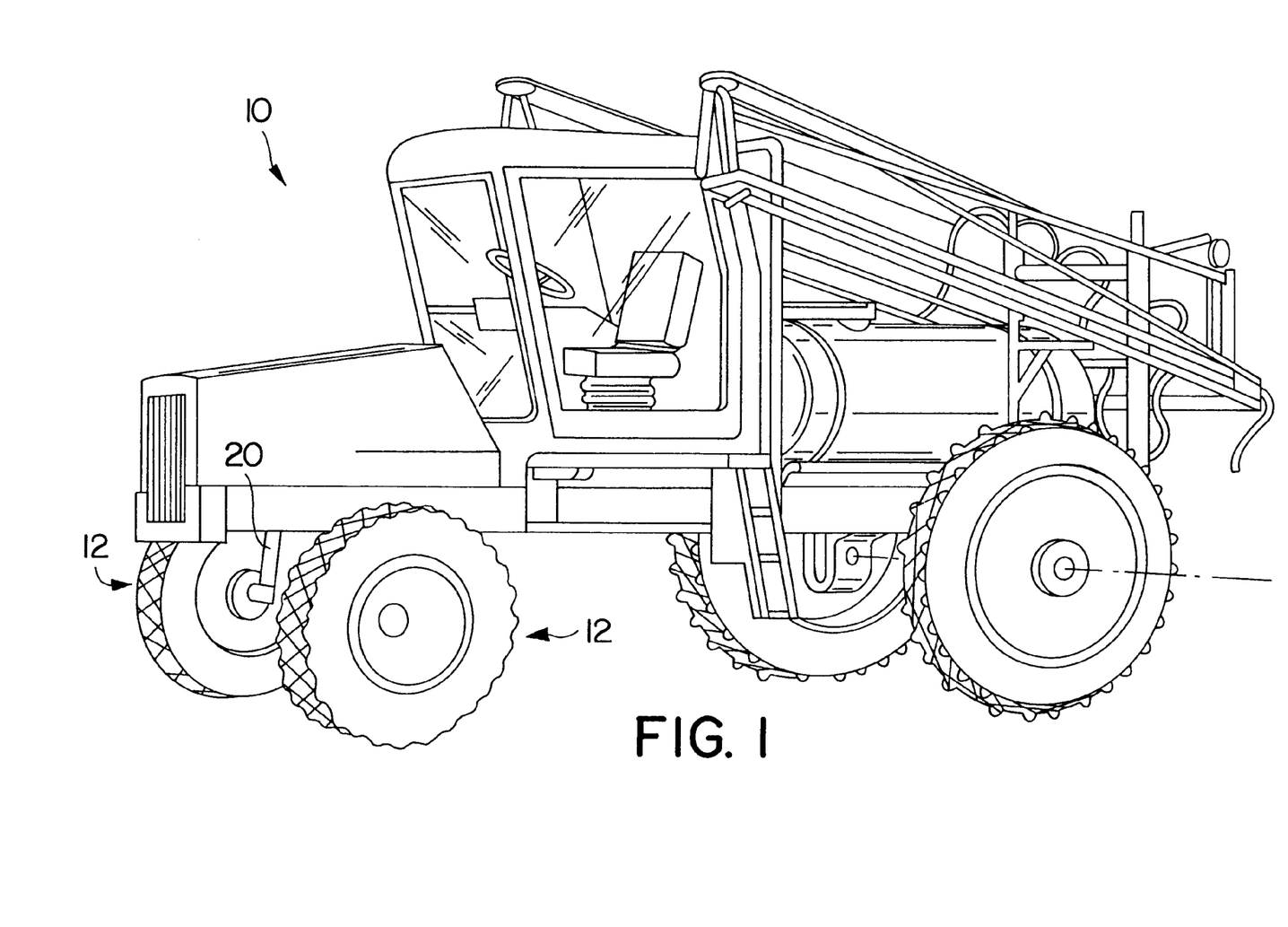
FIG. 1 is a perspective view of a farm vehicle showing a pair of spaced-apart front wheels to which a wheel-spacing mechanism and a steering mechanism in accordance with the present invention are coupled.
Figure 2:
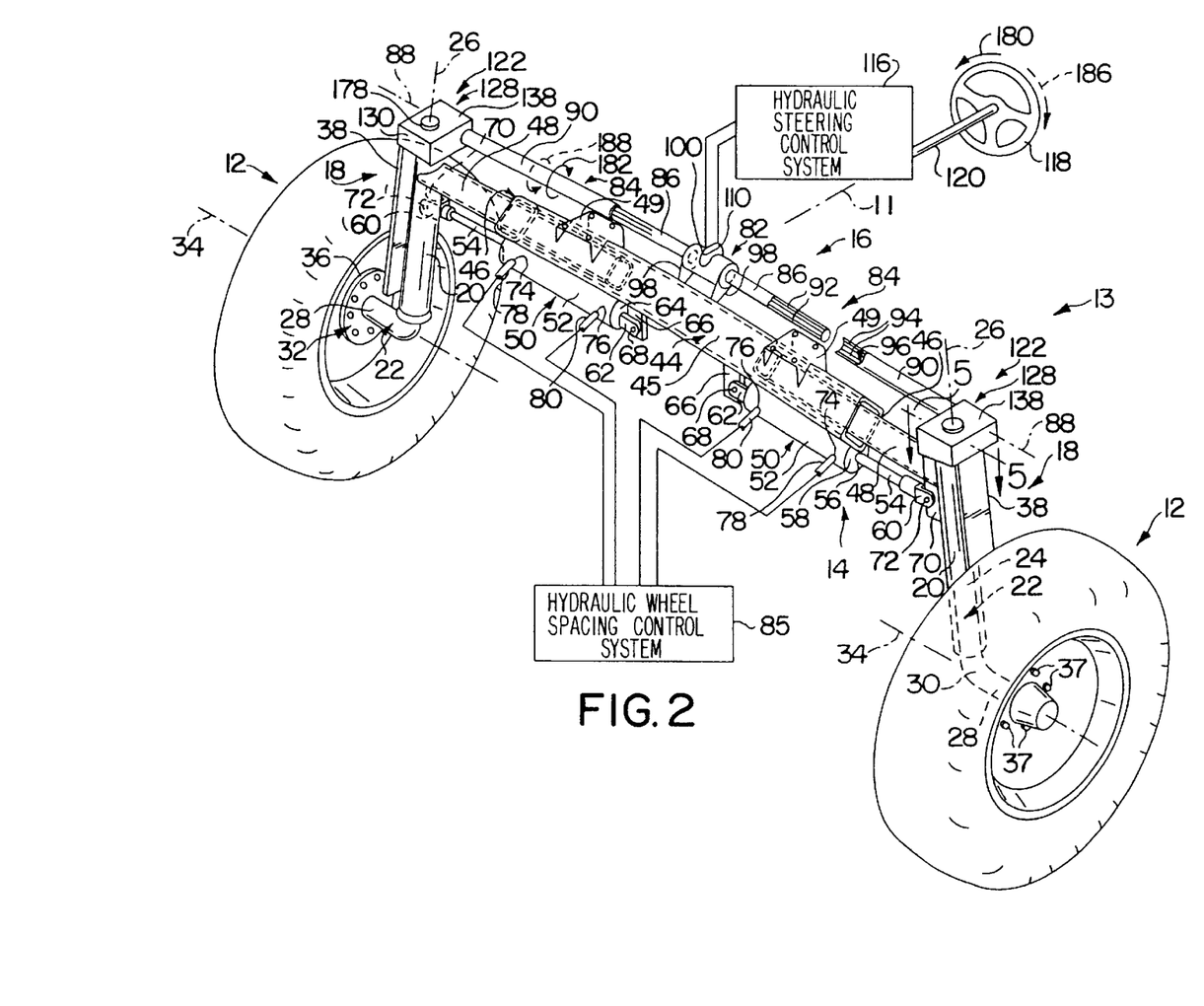
FIG. 2 is a perspective view of the wheel-spacing mechanism and the steering mechanism of the present invention, with portions broken away, showing the wheel-spacing mechanism including a center axle tube, a pair of opposing axle arms extending from ends of the center axle tube, and a hydraulic cylinder connecting each axle arm to the center axle tube, and showing the steering mechanism including a steering actuator mounted to the center axle tube and a pair of telescoping drive shafts extending away from the steering actuator in opposite directions, each of the telescoping drive shafts being coupled to a gear box, and each gear box being coupled to the respective front wheel by an L-shaped spindle shaft.

A vehicle 10, illustratively a field sprayer vehicle used for farming, includes a pair of spaced-apart front wheels 12 and a centerline 11 as shown in FIGS. 1 and 2. A front wheel assembly 13 including a wheel-spacing mechanism or wheel spacer 14 and a steering mechanism 16 in accordance with the present invention is coupled to front wheels 12 of vehicle 10 by a pair of spindle assemblies 18 as shown in FIG. 2. Each spindle assembly 18 includes a hollow spindle tube 20 and an L-shaped spindle shaft 22 having a generally vertical portion 24 received by spindle tube 20 for pivoting movement about a substantially vertical axis 26. Each spindle shaft 22 also includes a generally horizontal portion 28 connected to vertical portion 24 by an elbow portion 30.

A wheel hub 32 is mounted to horizontal portion 28 of each spindle shaft 22 for rotation about a substantially horizontal pivot axis 34 as shown in FIG. 2. Each wheel hub includes an annular flange 36 to which respective front wheels 12 are fastened by a plurality of bolts 37 so that front wheels 12 also rotate about pivot axis 34. Each spindle assembly 18 includes a stabilizer 38 having an upper end coupled to a top portion of spindle tube 20 and a lower end coupled to a bottom portion of spindle tube 20 to provide added rigidity and durability to spindle assembly 18.

Figure 3:
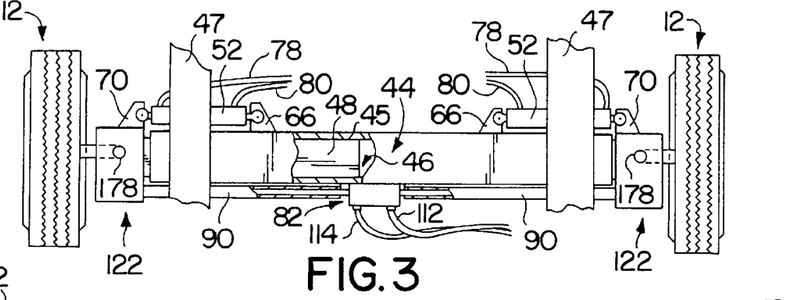
FIG. 3 is a top plan view of the wheel-spacing mechanism and the steering mechanism of FIG. 2, with portions broken away, showing each of the hydraulic cylinders of the wheel-spacing mechanism in a retracted position and each of the telescoping drive shafts of the steering mechanism in a retracted position.
Figure 4:
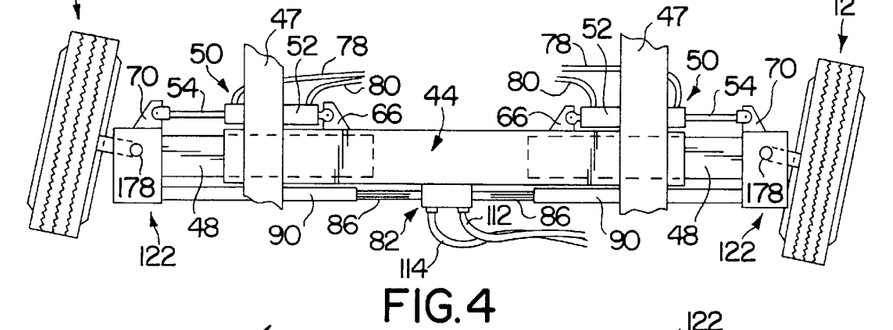
FIG. 4 is a top plan view of the wheel-spacing mechanism and the steering mechanism similar to FIG. 3 showing each of the hydraulic cylinders of the wheel-spacing mechanism in an extended position and each of the telescoping drive shafts of the steering mechanism in an extended position.

Wheel-spacing mechanism 14 includes a center axle tube 44 having a square-shaped side wall 45 defining an interior region 46. Wheel-spacing mechanism also includes a pair of opposing axle arms 48 extending from open ends of center axle tube 44 in opposite directions as shown in FIGS. 2–4. Spindle tubes 20 are fixed to outer ends of respective axle arms 48. Each axle arm 48 has a square-shaped cross-section and is sized to be telescopically received within interior region 46 of center axle tube 44 for sliding movement relative to center axle tube 44. Wheel-spacing mechanism 14 is mounted to a pair of chassis frame members 47 of vehicle 10 by a pair of brackets 49 which are fixed to center axle tube 44.

A wheel-spacing actuator 50 connects each axle arm 48 to center axle tube 44. Actuators 50 can be actuated so that axle arms 48 telescopically slide relative to center axle tube 44 between a retracted position, shown in FIG. 3, and an extended position, shown in FIG. 4, thereby adjusting the spacing between front wheels 12. Actuators 50 are illustratively hydraulic cylinders (hereinafter referred to as hydraulic cylinders 50), although it is within the scope of the invention as presently perceived for actuator 50 to be any type of actuator suitable for causing relative sliding movement of axle arms 48 relative to center axle tube 44.

Hydraulic cylinders 50 are conventional hydraulic cylinders having a cylinder 52, a piston (not shown), and a rod 54 extending through an aperture 56 formed in a first end wall 58 of cylinder 52. Each hydraulic cylinder 50 includes a first U-shaped connector bracket 60 coupled to an outer end of rod 54 and a second U-shaped connector bracket 62 coupled to a second end wall 64 of cylinder 52 as shown in FIG. 2. A pair of spaced-apart flanges 66 are fixed to center axle tube 44 and second connector brackets 62 of each hydraulic cylinder 50 are coupled to respective flanges 66 by a pin 68. In addition, a flange 70 is coupled to each axle arm 48 and first connector brackets 60 of each hydraulic cylinder 52 are coupled to respective flanges 70 by a pin 72.

Each hydraulic cylinder 50 includes a first fluid port 74 adjacent to first end wall 58 of cylinder 52 and a second fluid port 76 adjacent to second end wall 64 of cylinder 52. A first fluid hose 78 is connected to each cylinder 52 at port 74 and a second fluid hose 80 is connected to each cylinder 52 at port 76 as shown in FIGS. 3 and 4. Vehicle 10 includes a hydraulic wheel spacing control system 85 as shown in FIG. 2 in block diagram form. Control system 85 controls the flow of hydraulic fluid either into or out of each of ports 74, 76 through hoses 78, 80, respectively, thereby controlling the extension and retraction of rods 54 relative to cylinders 52.

A driver of vehicle 10 can activate control system 85 to force a volume of hydraulic fluid into the interior region of cylinders 52 through hoses 80 and ports 76, thereby causing the pistons within the interior regions of cylinders 52 to move toward respective first end walls 58 of cylinders 52 which, in turn, forces an equivalent volume of hydraulic fluid out of the interior regions of cylinders 52 through ports 74 and hoses 78. Movement of the pistons toward respective first end walls 58 extends rods 54 through apertures 56. Extension of rods 54 through apertures 56 moves first connector brackets 60 away from respective second connector brackets 62 which moves pins 68 and flanges 66 away from respective pins 72 and flanges 70 thereby telescopically extending axle arms 48 relative to center axle tube 44. Extension of axle arms 48 relative to center axle tube 44 increases the spacing between front wheels 12 of vehicle 10.

The driver can also activate control system 85 to force a volume of hydraulic fluid into the interior regions of cylinders 52 through hoses 78 and ports 74, thereby causing the pistons within the interior regions of cylinders 52 to move toward respective second end walls 64 of cylinders 52 which, in turn, forces an equivalent volume of hydraulic fluid out of the interior regions of cylinders 52 through ports 76 and hoses 80. Movement of the pistons toward respective second end walls 64 retracts rods 54 through apertures 56. Retraction of rods 54 through apertures 56 moves first connector brackets 60 toward respective second connector brackets 62 which moves pins 68 and flanges 66 toward respective pins 72 and flanges 70 thereby telescopically retracting axle arms 48 relative to center axle tube 44. Retraction of axle arms 48 relative to center axle tube 44 decreases the spacing between front wheels 12 of vehicle 10.

Thus, the driver of vehicle 10 can use wheel-spacing mechanism 14 to adjust the spacing between front wheels 12, for example, so that front wheels 12 are spaced to travel down the rows of a particular crop, thereby minimizing damage to the crop by front wheels 12. Hydraulic cylinders 50 of wheel-spacing mechanism 14 allow the front wheels 12 to be infinitely positioned between the extended position, shown in FIG. 4, and the retracted position, shown in FIG. 3.

Steering mechanism 16 includes a rotary motor or actuator 82 and a pair of telescoping drive shafts 84 extending outwardly away from motor 82 in opposite directions toward respective front wheels 12 as shown in FIGS. 2–4. Each telescoping drive shaft 84 includes an inner shaft 86 coupled to motor 82 for rotation about a generally horizontal drive axis 88 and an outer shaft 90 coupled to inner shaft 86 for telescoping movement relative to inner shaft 86 along axis 88. Outer shafts or mechanical linkage 90 each include an interior region 96 that receives a portion of respective inner shafts 86 as shown in FIG. 2.

Each inner shaft 86 is formed to include a plurality of longitudinally-extending grooves 92 and each outer shaft 90 is formed to include a plurality of longitudinally-extending splines 94 that project into interior regions 96 of outer shafts 90. Splines 94 of each outer shaft 90 are received by grooves 92 of respective inner shafts 86 for longitudinal sliding movement. In addition, receipt of splines 94 in grooves 92 establishes a rotational driving connection between inner shafts 86 and outer shafts 94 so that outer shafts 90 rotate about axis 88 in response to rotation of inner shafts about axis 88 by motor 82.

As actuators 50 extend and retract axle arms 48 relative to center axle tube 44, outer shafts 90 telescopically extend and retract, respectively, relative to inner shafts 86 so that splines 94 slide within grooves 92. Thus, the length of each drive shaft 84 is automatically adjusted to the proper length when wheel-spacing mechanism 14 changes the distance between front wheels 12. For example, drive shafts 84 are in an extended position when axle arms 48 are in their extended positions relative to center axle tube 44 and drive shafts 84 are in a retracted position when axle arms 48 are in their retracted positions relative to center axle tube 44.

Motor 82 is illustratively a hydraulic rotary motor, although it is within the scope of the invention as presently perceived for motor 82 to be any type of device suitable for causing rotation of telescoping drive shafts 84. Motor 82 is coupled to a middle portion of center axle tube 44 by a pair of flanges 98 so that drive shafts 84 are spaced apart from center axle tube 44 and axle arms 48 as shown in FIG. 2. In addition, motor 82 includes a first fluid port 100 and a second fluid port 110. A first fluid hose 112 is connected to each motor 82 at port 100 and a second fluid hose 114 is connected to each motor 82 at port 110 as shown in FIGS. 3 and 4.

Vehicle 10 includes a hydraulic steering control system 116 as shown in FIG. 2 in block diagram form. A steering wheel 118 is coupled to control system 116 by a steering shaft 120. Control system 116 controls the flow of hydraulic fluid either into or out of each of ports 100, 110 through hoses 112, 114, respectively, in response to rotation of steering wheel 118. Movement of hydraulic fluid through motor 82 simultaneously rotates both telescoping drive shafts 84 about horizontal drive axis 88.

Steering mechanism 16 includes a pair of gear boxes 122, each of which are mounted to a top end of respective spindle tubes 20 as shown in FIG. 2. Each gear box 122 includes an input shaft 124 formed to include a plurality of grooves 126, shown in FIG. 5, that receive corresponding splines 94 of outer shaft 90 so that input shafts 124 of gear boxes 122 are coupled to respective outer shafts 90 to rotate therewith about horizontal drive axis 88. Gear boxes 122 are also coupled to respective L-shaped spindle shafts 22 so that rotation of outer shafts 90 about horizontal drive axis 88 results in pivoting movement of spindle shafts 22 about respective vertical axes 26, thereby causing front wheels 12 of vehicle 10 to turn in unison as shown, for example, in FIG. 4.

Figure 5:
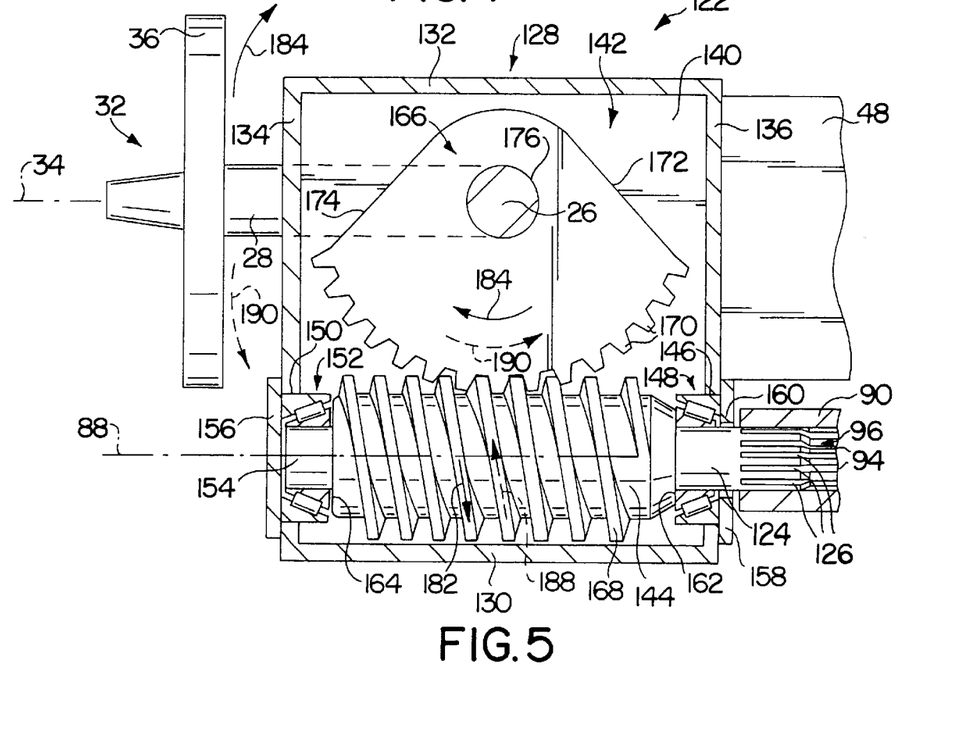
FIG. 5 is a cross-sectional view taken along line 5—5 of FIG. 2 showing one of the pair of gear boxes including a gear box housing, a worm gear coupled to the gear box housing by first and second tapered roller bearings, and a partial gear engaging the worm gear, the spindle shaft being coupled to the partial gear, and the respective outer shaft being coupled to the worm gear so that rotation of the outer shaft rotates the worm gear to pivot the spindle shaft about a vertical axis to turn the front wheel coupled to the gear box.

Each gear box 122 includes a housing 128 having a front wall 130, a rear wall 132 spaced apart from front wall 130, an outer side wall 134 extending between front and rear walls 130, 132 adjacent to stabilizer 38, an inner side wall 136 spaced apart from outer side wall 134 and extending between front and rear walls 132, 134, a top wall 138 extending between walls 130, 132, 134, 136, and a bottom wall 140 extending between walls 130, 132, 134, 136 beneath top wall 138. Walls 130, 132, 134, 136 cooperate with walls 138, 140 to define an interior region 142 of housing 128.

Input shaft 124 of each gear box is appended to a worm gear 144 which is positioned to lie within interior region 142 adjacent to front wall 130 of housing 128 as shown in FIG. 5. Inner side wall 136 of each gear box 122 is formed to include an aperture 146 that receives a first tapered roller bearing 148 and outer side wall 134 of each gear box 122 is formed to include an aperture 150 that receives a second tapered roller bearing 152. First tapered roller bearings 148 are mounted to respective input shafts 124 and second tapered roller bearings 152 are mounted to an end post 154 appended to respective worm gears 144. Thus, each worm gear 144 is supported by bearings 148, 152 for rotation about horizontal drive axis 34 relative to housing 128 of each gear box 122.

An end cover 156 is fastened to outer side wall 134 of each gear box 122 to close respective apertures 150 and to trap bearings 152 within respective apertures 152 and an end ring 158 is fastened to inner side wall 136 of each gear box 122 to trap bearings 148 within respective apertures 146. Each end ring 158 is formed to include an aperture 160 and input shafts 124 extend away from each worm gear 144 through respective apertures 160 as shown in FIG. 5. An inner shoulder 162 of each worm gear 144 abuts the respective bearing 148 and an outer shoulder 164 of each worm gear 144 abuts the respective bearing 152 so that worm gears 144 are constrained from axially moving along axis 34 relative to respective housings 128.

Each gear box 122 includes a partial gear 166 fixed to vertical portion 24 of respective spindle shafts 22 within interior region 142 of respective housings 128 as shown in FIG. 5 (left side gear box 122 only). Each worm gear 144 includes a helical thread 168 that coils about the main body of the respective worm gear 144 between inner and outer shoulders 162, 164 and each partial gear 166 includes a plurality of gear teeth 170 that engagingly mesh with respective helical threads 168. Each plurality of gear teeth 170 are arranged in an arc about the respective vertical axis 26 between an inner edge 172 and an outer edge 174 of the respective partial gear 166.

Vertical portion 24 of each spindle shaft 22 extends through an aperture (not shown) in respective bottom walls 140, through an aperture 176 formed in respective partial gears 166, and through an aperture 178 formed in respective top walls 138. Top and bottom walls 138, 140 of each housing 128 provide rotative bearing engagement between vertical portion 24 of the respective spindle shaft 22 and housing 128. However, it is within the scope of the invention as presently perceived for bearings or bushings to be positioned between vertical portions 24 of spindle shafts 22 and respective top and bottom walls 138, 140 to provide rotative bearing engagement between vertical portions 24 of spindle shafts 22 and housings 128.

In use, the driver can rotate steering wheel 118 in a direction indicated by arrow 180, shown in FIG. 2, to steer vehicle 10 to the right. When steering wheel 118 rotates in direction 180, control system 116 forces a volume of hydraulic fluid to flow into motor 82 through hose 114 and port 110, thus displacing an equivalent volume of hydraulic fluid out of motor 82 through port 100 and hose 112. Flow of hydraulic fluid through motor 82 from port 110 to port 100 rotates telescoping drive shafts 84 about drive axis 88 in a direction indicated by arrow 182, shown in FIG. 2, thereby causing worm gears 144 also to rotate in direction 182 about drive axis 88 as shown in FIG. 5.

Rotation of worm gears 144 in direction 182 in response to rotation of steering wheel 118 in direction 180 causes partial gears 166 to pivot about respective vertical axes 26 in a direction indicated by arrow 184 due to engagement of helical threads 168 with corresponding gear teeth 170 as shown in FIG. 5. Movement of partial gears 166 in direction 184 pivots each L-shaped spindle shaft 22 about the respective vertical axis 26 in direction 184 thereby turning both front wheels 12 to the right in unison.

The driver also can rotate steering wheel 118 in a direction indicated by arrow 186, shown in FIG. 2, to steer vehicle 10 to the left. When steering wheel 118 rotates in direction 186, control system 116 forces a volume of hydraulic fluid to flow into motor 82 through hose 112 and port 100, thus displacing an equivalent volume of hydraulic fluid out of motor 82 through port 110 and hose 114. Flow of hydraulic fluid through motor 82 from port 100 to port 110 rotates telescoping drive shafts 84 about drive axis 88 in a direction indicated by arrow 188, shown in FIG. 2 (in phantom), thereby causing worm gears 144 also to rotate in direction 188 about drive axis 88 as shown in FIG. 5 (in phantom).

Rotation of worm gears 144 in direction 188 in response to rotation of steering wheel 118 in direction 186 causes partial gears 166 to pivot about respective the vertical axis 26 in a direction indicated by arrow 190 due to engagement of helical threads 168 with corresponding gear teeth 170 as shown in FIG. 5 (in phantom). Movement of partial gears 166 in direction 190 pivots each L-shaped spindle shaft 22 about respective axes 26 in direction 190 thereby turning both front wheels 12 to the left in unison.

Thus, the driver of vehicle 10 can rotate steering wheel 118 in direction 180 and direction 186 to steer vehicle 10 to the right and left, respectively. Rotation of steering wheel 118 actuates motor 82 via hydraulic steering control system 116 to rotate telescoping drive shafts 84 about horizontal drive axis 88. Rotation of drive shafts 84 about axis 88 is transmitted through gear boxes 122 to respective spindle shafts 22 thereby pivoting spindle shafts 22 in unison about respective vertical axes 26 to turn front wheels 12 in unison. Motor 82 can be actuated to rotate telescoping drive shafts 84 when drive shafts 84 are in the retracted position, the extended position, or any position therebetween.

Although the invention has been described in detail with reference to a certain preferred embodiment and specific example, variations and modifications exist within the scope and spirit of the invention as described and as defined in the following claims.

What is claimed is:

1. A vehicle having a pair of front wheels coupled to a wheel assembly, the wheel assembly comprising:

a wheel-spacing mechanism including a center axle tube and a pair of axle arms coupled to the center axle tube for axial telescoping movement relative to the center axle tube, the wheel-spacing mechanism further including means for extending and retracting the axle arms relative to the center axle tube, a pair of spaced-apart spindle assemblies, each spindle assembly including a spindle shaft coupled to the respective axle arm for pivoting movement about a substantially vertical axis, each wheel being coupled to the respective spindle shaft for rotation about a substantially horizontal wheel axis, and a steering mechanism including a pair of telescoping drive shafts and means for rotating each telescoping drive shaft about a horizontal pivot axis, each telescoping drive shaft including a first end coupled to the rotating means and a second end coupled to the respective spindle shaft, the second end of the telescoping drive shafts moving axially relative to the first ends as the axle arms are moved relative to the center axle tube, and rotation of the telescoping drive shafts about the horizontal pivot axis pivots the spindle shafts about the respective vertical pivot axes to turn the front wheels in unison.

2. The vehicle of claim 1, wherein the steering mechanism includes a gear box coupling each telescoping drive shaft to the respective spindle shaft and each gear box transmits rotary movement of the respective drive shaft about the horizontal pivot axis to pivoting movement of the respective spindle shaft about the respective vertical axis to turn the front wheels in unison.

3. The vehicle of claim 2, wherein each gear box includes a worm gear coupled to the respective drive shaft and a partial gear coupled to the respective spindle shaft, the worm gear engaging the partial gear so that rotation of the worm gears by the drive shafts pivots the spindle shafts in unison.

4. The vehicle of claim 3, wherein the partial gears are fixed directly to the spindle shafts inside the respective gear box.

5. The vehicle of claim 2, wherein each gear box is positioned to lie above the axle arms of the wheel-spacing mechanism and the horizontal wheel axis of each front wheel is positioned to lie below the axle arms.

6. The vehicle of claim 1, wherein the means for rotating the telescoping drive shafts is a rotary hydraulic motor.

7. The vehicle of claim 6, wherein each telescoping drive shaft includes an inner shaft coupled to the hydraulic motor for rotation about the horizontal pivot axis and an outer shaft having a first end coupled to the inner shaft, the outer shaft having a second end coupled to the respective spindle shaft, the outer shafts telescopically moving relative to the inner shafts along the horizontal pivot axis as the spacing between the front wheels is adjusted by the wheel-spacing mechanism, and the inner shafts drivingly engaging the outer shafts so that rotation of the inner shafts by the hydraulic motor rotates the outer shafts about the horizontal pivot axis.

8. The vehicle of claim 6, wherein the hydraulic motor is mounted to the center axle tube and the drive shafts extend away from the hydraulic motor in opposite directions.

9. The vehicle of claim 1, wherein the telescoping drive shafts are positioned to lie between the spindle shafts above the front wheels.

10. The vehicle of claim 1, wherein the means for rotating the drive shafts is a rotary motor positioned to lie between the drive shafts so that the horizontal pivot axis extends through the rotary motor.

11. The vehicle of claim 1, wherein the wheel-spacing mechanism linearly extends and retracts the axle arms along an axis that is parallel to the horizontal pivot axis about which the telescoping drive arms pivot.

12. A vehicle having a pair of front wheels, the vehicle comprising:
 a chassis frame,
 a pair of spindle shafts coupled to the chassis frame for pivoting movement about a substantially vertical axis, each front wheel being coupled to the respective spindle shaft for rotation about a substantially horizontal wheel axis, and
 a steering mechanism including a horizontal drive shaft extending between the spindle shafts and an actuator for rotating the drive shaft about a horizontal pivot axis, the drive shaft being coupled to each spindle shaft, rotation of the drive shaft about the horizontal pivot axis pivots the spindle shafts about their respective vertical pivot axes to turn the front wheels in unison, the steering mechanism including a gear box coupling the drive shaft to the respective spindle shaft and each gear box transmits rotary movement of the respective drive shaft about the horizontal pivot axis to pivoting movement of the respective spindle shaft about the respective vertical axis to turn the front wheels in unison, and the gear boxes are positioned above the front wheels and the drive shaft extends between the gear boxes.

13. A vehicle having a pair of front wheels, the vehicle comprising:
 a chassis frame,
 a pair of spindle shafts coupled to the chassis frame for pivoting movement about a substantially vertical axis, each front wheel being coupled to the respective spindle shaft for rotation about a substantially horizontal wheel axis, and
 a steering mechanism including a horizontal drive shaft extending between the spindle shafts and an actuator for rotating the drive shaft about a horizontal pivot axis, the drive shaft being coupled to each spindle shaft, and rotation of the drive shaft about the horizontal pivot axis pivots the spindle shafts about their respective vertical pivot axes to turn the front wheels in unison, and
 means for moving the front wheels toward one another and away from one another relative to the chassis frame, the drive shaft being a telescoping drive shaft that automatically retracts and extends along the horizontal pivot axis as the front wheels are moved toward one another and away from one another, respectively.

14. The vehicle of claim 13, wherein the steering mechanism includes a gear box coupling the drive shaft to the respective spindle shaft and each gear box transmits rotary movement of the respective drive shaft about the horizontal pivot axis to pivoting movement of the respective spindle shaft about the respective vertical axis to turn the front wheels in unison.

15. The vehicle of claim 14, wherein each gear box includes a worm gear coupled to opposite ends of the drive shaft and a partial gear coupled to the respective spindle shaft, the worm gear engaging the partial gear so that rotation of the worm gears by the drive shafts pivots the spindle shafts in unison.

16. The vehicle of claim 15, wherein the partial gears are fixed directly to a top portion of the spindle shafts inside of the respective gear boxes.

17. The vehicle of claim 13, wherein the steering mechanism includes a gear box coupling the telescoping drive shaft to the respective spindle shaft, each gear box transmits rotary movement of the telescoping drive shaft about the horizontal pivot axis to pivoting movement of the respective spindle shaft about the respective vertical axis to turn the front wheels in unison, and the gear boxes move along with respective spindle shafts and front wheels as the front wheels are moved toward one another and away from one another.

18. The vehicle of claim 13, wherein the actuator for rotating the drive shaft about the horizontal pivot axis is a rotary hydraulic motor.

19. A vehicle having a pair of front wheels coupled to a wheel assembly, the wheel assembly comprising:
 a wheel-spacing mechanism including a center axle tube and a pair of axle arms coupled to the center axle tube for axial telescoping movement relative to the center axle tube, the wheel-spacing mechanism further including a pair of linear actuators, each linear actuator having a first end coupled to one of the axle arms and a second end coupled to the center axle tube, each linear actuator being movable to telescopically extend and retract the axle arms relative to the center axle tube,
 a pair of spaced-apart spindle assemblies, each spindle assembly including a spindle shaft coupled to the respective axle arm for pivoting movement about a substantially vertical axis, each wheel being coupled to the respective spindle shaft for rotation about a substantially horizontal axis, and
 a steering mechanism coupled to the spindle shafts and movable to pivot the spindle shafts in unison about the respective substantially vertical axes, the steering mechanism including a pair of telescoping drive shafts and a rotary actuator for rotating the telescoping drive shafts about a common horizontal pivot axis, each telescoping drive shaft including an inner shaft coupled to the rotary actuator and an outer shaft coupled to the inner shaft for telescoping movement, the outer shafts being coupled to the inner shafts so that rotation of the inner shafts by the rotary actuator rotates the outer shafts about the horizontal axis, the outer shafts axially telescoping relative to the first shafts as the actuators adjust the spacing of the wheels, the steering mechanism including a pair of gear boxes coupling each outer shaft to the respective spindle shaft so that rotation of the outer shafts about the horizontal pivot axis pivots the spindle shafts about the respective vertical pivot axes to turn the front wheels in unison.

20. A wheel assembly for a vehicle having a centerline, the wheel assembly comprising first and second wheels,
a wheel spacer coupled to the first and second wheels, the wheel spacer including an actuator configured to move at least one of the first and second wheels axially relative to the centerline of the vehicle, and
a steering mechanism including a mechanical linkage and an actuator configured to move the mechanical linkage, the mechanical linkage being coupled to the first and second wheels, movement of the wheel-spacer to move the at least one of the first and second wheels axially relative to the centerline of the vehicle moves the mechanical linkage, and movement of the mechanical linkage by the actuator moves the first and second wheels, the mechanical linkage including first and second telescoping drive shafts rotatably driven by the actuator.

21. The wheel assembly of claim 20, wherein the telescoping drive shafts are rotated by the actuator of the steering mechanism about a substantially horizontal axis.

22. The wheel assembly of claim 20, wherein the wheel spacer includes a center axle tube and a pair of axle arms coupled to the center axle tube for axial telescoping movement relative to the center axle tube.

23. The wheel assembly of claim 22, wherein the actuator of the wheel spacer includes a pair of linear actuators, each linear actuator includes a first end coupled to one of the axle arms and a second end coupled to the center axle tube, and each linear actuator is configured to move to telescopically extend and retract the axle arms relative to the center axle tube.

24. The wheel assembly of claim 20, further comprising a pair of spaced-apart spindle assemblies, each spindle assembly including a spindle shaft coupled to the wheel spacer, and each wheel being coupled to the respective spindle shaft for rotation about a substantially horizontal wheel axis.

25. The wheel assembly of claim 20, wherein the steering mechanism includes first and second gear boxes coupled to the mechanical linkage and the first and second wheels, respectively, and the first and second gear boxes are positioned to lie above the first and second wheels.

26. The wheel assembly of claim 25, wherein each gearbox includes a worm gear coupled to the mechanical linkage and a partial gear coupled to the respective wheel, the worm gear engaging the partial gear so that rotation of the worm gears by the mechanical linkage pivots the first and second wheels in unison.

27. The wheel assembly of claim 20, wherein each of the first and second telescoping drive shafts are positioned between one of the first and second wheels and the actuator.

28. A wheel assembly for a vehicle having a centerline, the wheel assembly comprising first and second wheels,
a wheel spacer coupled to the first and second wheels, the wheel spacer including an actuator configured to move at least one of the first and second wheels axially relative to the centerline of the vehicle, and
a steering mechanism including a mechanical linkage and an actuator configured to move the mechanical linkage, the mechanical linkage being coupled to the first and second wheels, movement of the wheel-spacer to move the at least one of the first and second wheels axially relative to the centerline of the vehicle moves the mechanical linkage, and movement of the mechanical linkage by the actuator moves the first and second wheels, the actuator of the steering mechanism rotates the mechanical linkage about a horizontal pivot axis to pivot the first and second wheels about respective first and second substantially vertical pivot axes.

29. The wheel assembly of claim 28, wherein each of the first and second telescoping drive shafts are positioned between one of the first and second wheels and the actuator.

30. The wheel assembly of claim 28, wherein the steering mechanism includes first and second gear boxes coupled to the mechanical linkage and the first and second wheels, respectively, and the first and second gear boxes are positioned to lie above the first and second wheels.

31. The wheel assembly of claim 30, wherein each gear box includes a worm gear coupled to the mechanical linkage and a partial gear coupled to the respective wheel, the worm gear engaging the partial gear so that rotation of the worm gears by the mechanical linkage pivots the first and second wheels in unison.

32. The wheel assembly of claim 28, wherein the wheel spacer includes a center axle tube and a pair of axle arms coupled to the center axle tube for axial telescoping movement relative to the center axle tube.

33. The wheel assembly of claim 32, wherein the actuator of the wheel spacer includes a pair of linear actuators, each linear actuator includes a first end coupled to one of the axle arms and a second end coupled to the center axle tube, and each linear actuator is configured to move to telescopically extend and retract the axle arms relative to the center axle tube.

34. The wheel assembly of claim 28, further comprising a pair of spaced-apart spindle assemblies, each spindle assembly including a spindle shaft coupled to the wheel spacer, and each wheel being coupled to the respective spindle shaft for rotation about a substantially horizontal wheel axis.

35. A wheel assembly for a vehicle having a centerline, the wheel assembly comprising first and second wheels,
a wheel spacer coupled to the first and second wheels, the wheel spacer including an actuator configured to move at least one of the first and second wheels axially relative to the centerline of the vehicle, and
a steering mechanism including a mechanical linkage and an actuator configured to move the mechanical linkage, the mechanical linkage being coupled to the first and second wheels, movement of the wheel-spacer to move the at least one of the first and second wheels axially relative to the centerline of the vehicle moves the mechanical linkage, and movement of the mechanical linkage by the actuator moves the first and second wheels, the steering mechanism including first and second gear boxes coupled to the mechanical linkage and the first and second wheels, respectively, and the first and second gear boxes being positioned to lie above the first and second wheels.

36. The wheel assembly of claim 35, wherein each gear box includes a worm gear coupled to the mechanical linkage and a partial gear coupled to the respective wheel, the worm gear engaging the partial gear so that rotation of the worm gears by the mechanical linkage pivots the first and second wheels in unison.

37. The wheel assembly of claim 35, wherein the wheel spacer includes a center axle tube and a pair of axle arms coupled to the center axle tube for axial telescoping movement relative to the center axle tube.

38. The wheel assembly of claim 37, wherein the actuator of the wheel spacer includes a pair of linear actuators, each linear actuator includes a first end coupled to one of the axle arms and a second end coupled to the center axle tube, and each linear actuator is configured to move to telescopically extend and retract the axle arms relative to the center axle tube.

39. The wheel assembly of claim 35, further comprising a pair of spaced-apart spindle assemblies, each spindle assembly including a spindle shaft coupled to the wheel spacer, and each wheel being coupled to the respective spindle shaft for rotation about a substantially horizontal wheel axis.

40. A wheel assembly for a vehicle having a centerline, the wheel assembly comprising:

first and second wheels, a wheel spacer coupled to the first and second wheels, the wheel spacer including an actuator configured to move at least one of the first and second wheels axially relative to the centerline of the vehicle, and a steering mechanism including a mechanical linkage and an actuator configured to move the mechanical linkage, the mechanical linkage being coupled to the first and second wheels, movement of the wheel-spacer to move the at least one of the first and second wheels axially relative to the centerline of the vehicle moves the mechanical linkage, and movement of the mechanical linkage by the actuator moves the first and second wheels, the mechanical linkage including first and second telescoping drive shafts, each of the first and second telescoping drive shafts being positional between one of the first and second wheels and the actuator.

41. The wheel assembly of claim 40, wherein the steering mechanism includes first and second gear boxes coupled to the mechanical linkage and the first and second wheels, respectively, and the first and second gear boxes are positioned to lie above the first and second wheels.

42. The wheel assembly of claim 41, wherein each gear box includes a worm gear coupled to the mechanical linkage and a partial gear coupled to the respective wheel, the worm gear engaging the partial gear so that rotation of the worm gears by the mechanical linkage pivots the first and second wheels in unison.

43. The wheel assembly of claim 40, wherein the wheel spacer includes a center axle tube and a pair of axle arms coupled to the center axle tube for axial telescoping movement relative to the center axle tube.

44. The wheel assembly of claim 43, wherein the actuator of the wheel spacer includes a pair of linear actuators, each linear actuator includes a first end coupled to one of the axle arms and a second end coupled to the center axle tube, and each linear actuator is configured to move to telescopically extend and retract the axle arms relative to the center axle tube.

45. The wheel assembly of claim 40, further comprising a pair of spaced-apart assemblies, each spindle assembly including a spindle shaft coupled to the wheel spacer, and each wheel being coupled to the respective spindle shaft for rotation about a substantially horizontal wheel axis.

* * * * *